United States Patent [19]

Bentley-Leek

[11] 3,774,277
[45] Nov. 27, 1973

[54] METHOD OF MANUFACTURING VALVE SEATING RINGS

[75] Inventor: Herbert Bentley-Leek, Hereford, England

[73] Assignee: Saunders Valve Company Limited

[22] Filed: Aug. 18, 1972

[21] Appl. No.: 281,991

Related U.S. Application Data

[62] Division of Ser. No. 704,366, Feb. 9, 1968, abandoned.

[52] U.S. Cl............. 29/157.1 R, 29/404, 29/445, 29/527.1, 251/317, 264/296, 264/326
[51] Int. Cl... B21d 53/00, B21k 29/00, B23p 15/02
[58] Field of Search.............. 29/157.1 R, 445, 29/404, 527.1; 264/296 X, 326 X; 251/317 X

[56] References Cited
UNITED STATES PATENTS

| | | | |
|---|---|---|---|
| 2,747,905 | 5/1956 | Clade | 29/157.1 R X |
| 2,866,999 | 1/1959 | Taylor | 264/296 X |
| 3,041,036 | 6/1962 | McFarland | 29/157.1 R UX |
| 3,059,898 | 10/1962 | Carlson et al. | 29/157.1 R UX |
| 3,087,232 | 4/1963 | Dow | 29/157.1 R |
| 3,132,837 | 5/1964 | Britton | 251/317 X |
| 3,222,762 | 12/1965 | Nowlin | 29/157.1 R |

Primary Examiner—Charlie T. Moon
Attorney—Lawrence R. Radanovic

[57] ABSTRACT

The specification of this application discloses a novel method of ensuring accuracy of the sealing surfaces of a plug cock seating ring by compressing an oversize molded ring in a jig providing surfaces simulating those to which the ring is to seal in use.

1 Claim, 1 Drawing Figure

Patented Nov. 27, 1973
3,774,277
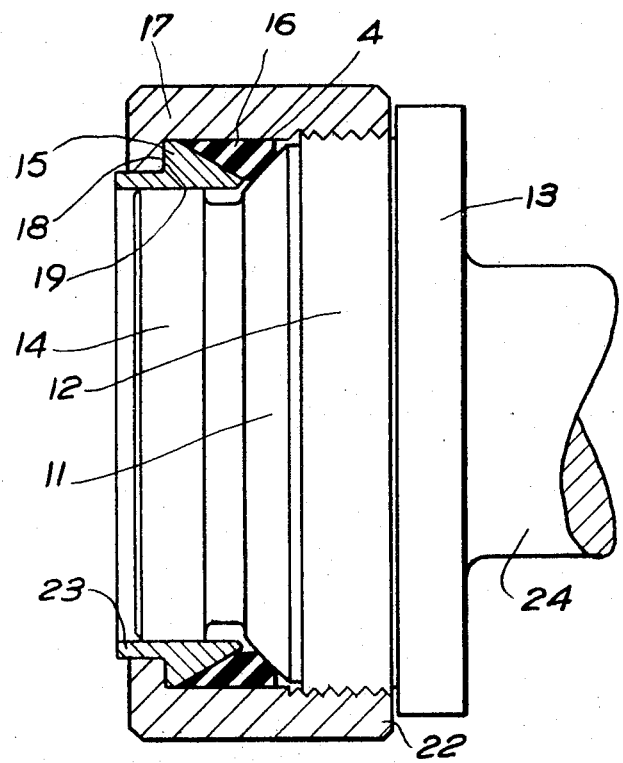
Inventor
Herbert Bentley-Leek
By
Watson, Cole, Grindle & Watson
Attys.

METHOD OF MANUFACTURING VALVE SEATING RINGS

This is a division of application, Ser. No. 704,366 filed Feb. 9, 1968 now abandoned.

This invention relates to spherical plug cocks, often known and hereinafter referred to as ball valves.

For certain services such valves are often provided with seating rings of tough plastics material such as PTFE (polytetrafluoroethylene), PCTFE (polychlorotrifluoroethylene) and filled nylon. These materials are slightly resilient and mouldable and they have very desirable properties as regards temperature resistance, chemical inertia and coefficient or friction. Both to keep the bulk of the valve casing down and because at least some of these materials are expensive it is desirable to keep the scantlings of the seating ring as small as practicable. It is necessary however for the rings not only to make a good seal with the ball, but to be sealed to the casing of the valve. So far as each ring itself is concerned only a narrow seating surface to contact the ball is necessary, but to ensure good surface contact not only must the rings be given some freedom to move axially and the ball be given some freedom to set itself between the two seating surfaces, but consequent upon the axial freedom of the rings they must be resiliently pressed towards the ball. Sealing to the casing while leaving axial freedom usually involves either using a much larger cross section than would suffice to provide the necessary seating surface and hence to an excessive bulk of the plastics material, or an additional impervious flexible connection sealed at one end to the ring and the other to the casing. While such flexible connections and their seals can be made of much less expensive material than PTFE and PCTFE their accommodation involves extra bulk and therefore weight of the valve casing.

To reduce the bulk of the rings and of the casing it has been proposed to provide the back of each seating ring with a frusto-conical countersink into which fits the tapered end of a thrust ring through which the pressure of an annular spring of short axial dimensions is applied and which thrust ring not only presses the seating ring against the ball but expands the rear portion of the seating ring into sealing contact with the wall of a counterbore in the valve casing in which the assembly of seating ring and thrust ring is lodged.

The slight resilience of the plastics materials under consideration with appropriate proportions of the ring permits slight expansion but satisfactory performances of such ring assemblies involves the maintenance of extremely narrow dimensional tolerances in the manufacture of the elements of the assembly because the slight expansion must just make sealing contact, while in the axial direction, stop surfaces provided in the valve casing limit the total float of the assemblies in this direction and this in conjunction with the axial shortness of the springs and their consequent high rate means that quite small inaccuracies in the axial direction result in too low or too high pressure of the assemblies against the ball. So far as the thrust ring is concerned this can be of metal and though the tolerances to be satisfied at least on the length and angle of the taper to produce a valve of satisfactory performance and life for aircraft purposes are narrow they can be met by high class workmanship. But so far as the plastics material ring is concerned whether machined from the solid or moulded, changes occur after the ring has been released from the machine or mould which vary from ring to ring beyond the allowable tolerances.

The materials under consideration are capable of a small amount of cold flow and the present invention makes use of this to provide seating assemblies of the above described character (i.e. consisting of a plastics material seating ring having a frusto-conical countersink on the back of the ring into which fits the tapered end of a thrust ring) which are of adequate dimensional accuracy while allowing the ring element of the assembly to be made under commercially acceptable conditions.

According to one aspect of the invention there is provided a method of finishing to desired dimensional tolerances a ball valve seating ring moulded in a plastics material which is subject to dimensional changes after moulding, said method comprising positioning the moulded seating ring in a jig presenting to such ring spherical and cylindrical surfaces corresponding to the ball and bore wall surfaces with which the seating ring is to co-operate in use and compressing the seating ring axially to cause the material thereof to undergo cold-flow into intimate contact with such jig surfaces.

According to another aspect of the invention there is provided a method of making a ball valve seating ring comprising moulding the ring in a plastics material, positioning the moulded ring in a jig presenting to such ring spherical and cylindrical surfaces corresponding to the ball and bore wall surfaces with which the ring is to co-operate in use and compressing the ring axially to cause the material thereof to cold-flow into intimate contact with such jig surfaces.

In carrying the invention into effect a moulded seating ring which is slightly oversize at least in length and a thrust ring of finished size are assembled and the assembly is brought to correct overall length and size and position of the seating surface and external diameter of the seating ring in relation to one another and the thrust ring by operations which include at least a cold moulding operation which crushes the assembly axially. In greater detail the assembly is compressed axially in a jig or fixture which includes a spherical surface accurately simulating in form and position the relevant part of the valve ball and a cylindrical surface accurately simulating the relevant part of the wall of the counterbore in the valve casing, the axial compression being terminated when the axial overall length of the assembly is still a little greater than the required value, and while the assembly is still in the jig the rear end surface of the thrust ring remote from the seating surface, which engages the stop, surface in the valve casing, is machined to bring the overall length to the required value. The term axial overall length used for convenience and simplicity may be defined as the axial distance between two planes normal to the axis of the assembly, one passing through and containing the rear end surface of the thrust ring and the other passing through the seating surface at some chosen diameter thereof.

The machining operation is facilitated by the use of a machine tool provided with a tool the final position of which is determined by a stop directly or indirectly associated with the jig or fixture.

It would be possible to arrange the jig to effect crushing up to a predetermined overall length of the ring element, but preferably the crushing is effected up to a predetermined pressure as this allows greater tolerance on the size and form of the uncrushed ring element; the variations which may occur are corrected in the final machining operation.

By the invention the three dimensions of the assembly and the relative positions of the two surfaces thereof which determine the performance of the valve, namely the spherical radius of the seating surface, the outer diameter of the seating ring and the overall length of the assembly and the relative position of the seating surface and the outer diameter of the seating ring, can be kept within such closer limits than are necessary in the making of the seating ring and thrust ring, in other words the assembly can be held within the limits necessary for satisfactory performance and life while the two elements can be made to tolerances which are commercially feasible. In particular comparatively wide tolerances can be allowed on the axial lengths of the two elements and on the taper angle because it is the overall length and the accuracy of fit of the taper which are critical and the method deals with these irrespective of the errors in the elements themselves.

A further advantage of the method is that the compressions of the material of the seating ring in the neighbourhood of the seating surface increases its wearing qualities. This may be enhanced by embedding a particulate reinforcement in the region of the seating surface.

It will be understood that the dimensions of the elements and the tolerances on these dimensions are made such that the overall length of the assembly when put into the jig or fixture is at least sufficiently greater than the required value to ensure that due to cold flow of the material of the seating ring the tapers become matched, the seating ring is brought to size on its external cylinder surface and the seating surface is matched to the spherical surface in the jig or fixture. The length of the assembly before cold moulding must not be so great however that the material will undergo more compression than it can tolerate without damage.

The jig or fixture should be provided with spaces into which material of the seating ring can expand after the cylindrical surface and seating surface have been pressed firmly against the corresponding surfaces in the jig or fixture and before reduction to overall length is reached.

The jig or fixture is desirably dimensioned to leave the assembly very slightly oversized on the diameter of the seating ring and the overall length, to allow for a "bedding-in" operation involving very slight further compression of the assembly on assembly into the valve. The overall length is suitably arranged so that this bedding-in is accomplished by the operation of assembling the valve so that at this stage the rear end surface of the thrust ring is against the stop surface in the casing and the seating surface is against the ball. Then as wear occurs in use it is taken up by the spring. As the outer diameter of the thrust ring is not changed in the jig or fixture or in the final assembly in the valve the diameter of any external cylindrical portion is machined to the appropriate diameter in its original production.

An example of a jig or fixture by which the invention can be practised is illustrated in section in the accompanying drawing.

The jig shown in the drawing comprises a spherical portion 11 of appropriate spherical radius and subtending an appropriate angle to simulate the relevant part of the valve ball for which the seating is to be prepared. To one side there is a screw-threaded portion 12 of larger diameter followed by a flange 13, these parts being accurately coaxial. To the other side is a spigot 14 accurately coaxial and of a diameter to fit the bore of and thus centre and align the thrust ring 15 of the assembly which also comprises the seating ring 16. On to the portion 12 screws a collar nut 17 which by a surface 18 engages the thrust surface 19 of the ring 15 and thus presses the assembly axially towards the portion 11, leaving a skirt 23 on the ring projecting through the seat. The cylindrical bore 21 of the nut accurately simulates the counterbore in the valve casing for which the assembly is being prepared. The nut is tightened by means of a so-called torque spanner so that a predetermined pressure is applied to the assembly. This valve should be reached before the end surface 22 of the nut abuts the flange 13, the parts being dimensioned accordingly. If the size of the ring element can be sufficiently relied on, instead of tightening to a predetermined pressure, the nut could be rightened until its surface 22 abuts the flange 13, the dimensions being suitably modified. It will be seen that space is left inside and outside the ring 16 in the neighbourhood of the seating surface into which the material can expand so far as necessary.

Alternatively to a nut the jig could incorporate a sliding member actuated hydraulically, either to a predetermined pressure or a predetermined position. After the assembly has been compressed, the end surface 25 of the skirt is machined to the correct overall length. To this end the body of the jig or fixture may be integral with or mounted on a mandrel 24 forming part of a machine tool for the purpose, a stop being provided for the tool, located with reference to the mandrel.

I claim:

1. In the manufacture in plastics material of a ball valve seating ring having a countersink formation formed around the bore of the ring, the method comprising:

molding the seating ring to substantially the desired shape and dimensions in a mold, removing the molded seating ring from the mold, inserting a frusto-conical thrust ring into the countersink formation in the molded seating ring, positioning the molded seating ring in a jig which presents to such seating ring spherical and cylindrical surfaces corresponding, respectively, to the ball surface and the bore wall surface with which the seating ring is to cooperate in use, applying pressure to said thrust ring to displace it axially of the seating ring towards the interior of said jig whereby to compress said seating ring axially to cause the material of the seating ring to undergo cold-flow into intimate contact with said spherical and cylindrical jig surfaces, machining an exposed end face of said thrust ring while the assembly of thrust ring and seating ring are in the jig and after said axial compression, releasing the pressure on said thrust ring and removing the molding shaped and machined seating ring from the jig.

* * * * *